UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

DRIED SULFITE-WASTE-LIQUOR SOLID AND PROCESS OF MAKING SAME.

1,311,217. Specification of Letters Patent. Patented July 29, 1919.

No Drawing. Application filed May 8, 1917. Serial No. 167,332.

*To all whom it may concern:*

Be it known that I, CARLETON ELLIS, a citizen of the United States, and a resident of Montclair, in the county of Essex and State of New Jersey, have invented certain new and useful Improvements in Dried Sulfite-Waste-Liquor Solids and Processes of Making Same, of which the following is a specification.

This invention relates to a form of sulfite cellulose waste liquor solids and relates particularly to a finely-divided product prepared from the dried solids. This application is a continuation in part of matter appearing in my co-pending application Serial 757,301.

Sulfite cellulose waste liquor may be concentrated and dried to a solid condition and as stated in said co-pending application, the drying may take place, for example, in an atomizing system which yields the material in a pulverulent condition. In the present case the sulfite liquor is dried to a solid and ground to a powder to afford a finely-divided, or even impalpable product, and one that is readily soluble in water and may be dissolved therein to form a solution suitable as a binding agent.

I preferably concentrate the liquor in an acid condition so as to produce dried solids which are of an acid nature. In one form of my invention I may partially neutralize the crude sulfite liquor preferably approximately to one-half its normal acidity so as to yield a semi-acid product which may be concentrated to a solid form and then ground to a powder, giving the product of the present invention.

As stated in my co-pending application Serial No. 779,516 the liquid may be evaporated in an acid condition to produce the semi-acid compound referred to, having the normal acidity reduced to about one-half by the addition of lime or other basic neutralizing material. The liquor in the original condition of acidity may be first concentrated, if desired and the concentrated liquor then treated with sufficient lime or equivalent material to neutralize about half of its acidity, but it is preferable to carry out the acidity, but it is preferable to carry out the concentration with the liquor after the neutralization of one-half of its acidity, as the product in the dry form subsequently derived is desirably stable. Of course, in concentrating the material the sulfurous acid present in a free state may be eliminated in the early stages and after the free sulfurous acid has been removed, the lime or other neutralizing agent may be added to secure the requisite degree of acidity, when the concentration is completed to the dry state.

The evaporation to the dry state may be effected, as above stated, by atomizing the partially concentrated liquor in a current of hot gaseous medium, as described in my co-pending application, Serial No. 757,301, (now Patent 1,246,805), or in any other suitable manner. It is obvious that the liquor or the solids should not be heated sufficiently to destroy the adhesive or tanning properties thereof.

The dried material can be crushed or comminuted, to produce a powder, and the comminuted material is capable of use as a binder in making briquets, etc., or as a road bonding agent, or as a tanning compound, or for other uses.

In the drying or concentration of ordinary (unneutralized) or partly neutralized sulfite waste liquor, volatile acids contained in the liquor, such as dissolved sulfur dioxid, will normally be vaporized and accordingly removed from the liquor. In referring herein to the acidity of sulfite waste liquor, it is accordingly advisable to distinguish between that portion of the acidity of the liquor, which is caused by the presence of non-volatile substances (referred to as "fixed acidity"), and that portion of the acidity which is caused by the presence of dissolved $SO_2$ and other relatively volatile substances which will be normally vaporized, and hence removed from the liquor during concentration and evaporation (referred to as "volatile acidity").

What I claim is:—

1. The process of making a binding agent which comprises evaporating sulfite cellulose waste liquor to a solid state while containing a considerable part but not all of its normal fixed acidity, and in grinding the dried material to a powder.

2. The process of treating cellulose sulfite waste liquor which comprises evaporating the liquor in an acid state while containing a material part of its original acidity to form a solid mass and in comminuting the latter.

3. The process of treating cellulose sulfite waste liquor which comprises neutralizing a material part, but not approximately the entire amount of its normal fixed acidity, then evaporating the partially neutralized liquor to a solid mass and in comminuting the latter.

4. The process of treating sulfite cellulose waste liquor which comprises expelling free sulfurous acid from the liquor, concentrating and neutralizing with lime to about one-half the original acidity of the non-volatile constituents, in drying the product and comminuting the same.

5. The process which comprises neutralizing about one-half of the normal fixed acidity of sulfite waste liquor, and evaporating the liquor to dryness and comminuting the solid product.

6. As a new article of manufacture dried comminuted fragmental sulfite cellulose waste liquor solids, said product containing a considerable part but not all of the normal fixed acidity of the original liquor.

CARLETON ELLIS.